No. 740,780. Patented October 6, 1903.

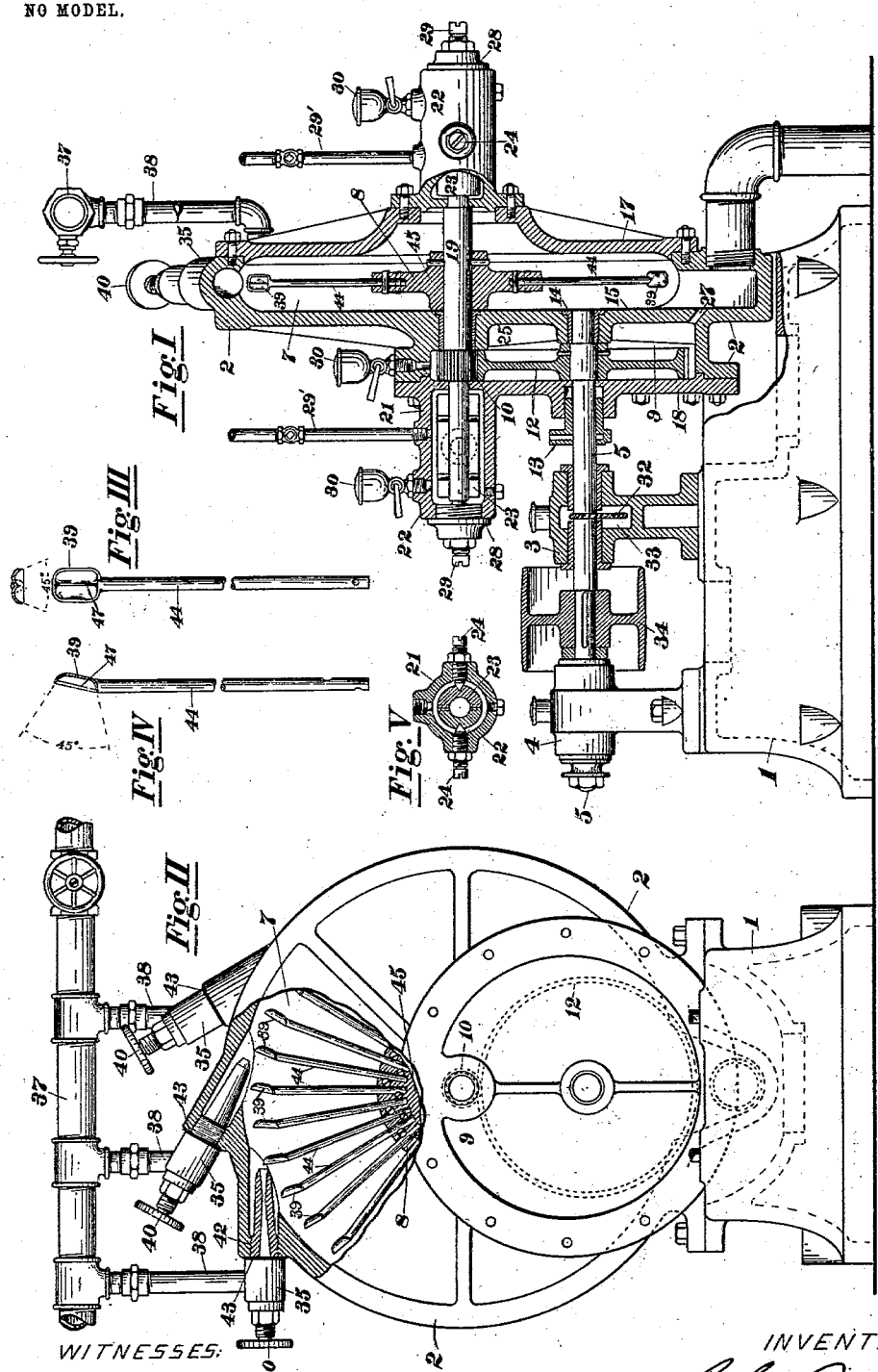

UNITED STATES PATENT OFFICE.

JOHN RICHARDS, OF SAN FRANCISCO, CALIFORNIA.

STEAM-TURBINE.

SPECIFICATION forming part of Letters Patent No. 740,780, dated October 6, 1903.

Application filed December 9, 1902. Serial No. 134,578. (No model.)

*To all whom it may concern:*

Be it known that I, JOHN RICHARDS, a citizen of the United States, residing at San Francisco, county of San Francisco, and State of California, have invented certain new and useful Improvements in Steam-Turbines; and I hereby declare the following to be a full, clear, and exact description of the same, reference being had to the accompanying drawings, forming a part of this specification.

This invention relates to motive engines operated by steam or any expansive fluid and to certain improvements therein, as hereinafter described, and illustrated in the drawings that form a part of this specification.

The improvement consists in a main casing or containing-chamber in which the motive wheel revolves and a second chamber in which reducing-gearing is placed integrally formed and with removable covers at the sides, devices to avoid heat convection from conducting passages and pipes and to maintain a low temperature in the main casing, a series of vanes to receive the impinging fluid made integral with radial stems of small section that occupy the principal plane of the wheel's rotation, double-shell bearings for the wheel-spindle, the inner shells being pivoted and flooded with oil, and in other features hereinafter more fully described, and pointed out in claims appended hereto.

The object of the invention is to provide in a simple and inexpensive form a fluid-impulse engine adapted for general purposes.

Referring to the drawings, Figure I is a longitudinal section of an engine constructed according to my invention. Fig. II is an end view of the same engine, partially in section and with one of the covering-plates removed. Fig. III is an enlarged front view of one of the impelling buckets or vanes with its supporting-stem. Fig. IV is a side view of Fig. III. Fig. V is a transverse section through one of the main-spindle bearings.

The base-frame 1 is made hollow and adapted to support the main casing 2 and the bearings 3 and 4 for the second or transmitting shaft 5.

The main casing 1 is formed with a circular chamber 7, in which the motive wheel revolves, and a chamber 9, in which is placed reducing-gearing consisting of a tooth-pinion 10 and a corresponding gear-wheel 12, mounted on the shaft 5. Around this shaft 5 is a packing-gland 13, that forms in part a bearing, and a second internal bearing 14 is placed in the division-wall 15 of the main casing 1. Removable plates 17 and 18 cover the chambers 7 and 9.

The main spindle 19, on which the motive wheel 8 is mounted, is held at the ends in the supports 21, consisting of outer and inner shells 22 and 23, the latter being made in two parts, as shown in Fig. V, and held by the pointed pivoting-screws 24, that permit oscillatory movement of the inner bearings in a vertical plane. These shells 23 are also practically pivoted in a horizontal plane by the two halves sliding one upon the other, so the bearings are free to adjust themselves in all planes to a true alinement. A bearing 25 in the wall of the main casing assists in maintaining the spindle 19 against lateral thrust caused by the pinion 10.

The chambers 7 and 9 communicate by a drain-passage 27, also through the running bearings 14 and 25. The chamber 7 is connected to a condenser or is open to the atmosphere, accordingly as the engine is condensing or non-condensing.

The external or oil-containing shells 22 of the main-spindle bearings 21 are closed at the ends by screw-plugs 28, provided with end bearing-screws 29 at the ends of the spindle 19 to prevent end play. Water-supply pipes 29' connect to the bearings 22 to keep them cool in case of heating and to promote lubrication.

Closed oil-cups 30 are applied to all bearings that communicate with the interior of the chambers 7 and 9, and the bearings 3 and 4 have lubricating-wicks 32, that are suspended in the oil-chambers 33 in the usual manner. Power is transmitted from a pulley 34 or directly from the shaft 5, as required.

Steam is admitted through one or more nozzles 35 from a pipe 37 and branches 38 and impinges tangentially on the vanes 39 of the motive wheel 8 and are adjusted by the hand-wheels 40 in the usual manner. The nozzles can be of any form in respect to their bore, which terminates at some distance from the vanes 39 to permit a proper degree of expansion, such as occurs by the free efflux of steam The nozzles 35 have no direct connection with the main casing 2, except by the screwed nipples 42, heat-insulating collars 43 being applied between the main body of the nozzles and the main casing 2, as shown in Fig. II. This construction prevents a high temperature in the main casing and its connected parts, also permits easy maintenance of bearings and gearing therein, and promotes condensation of steam after its impingement on the vanes 39.

The motive wheel 8 is made with as few vanes 39 as possible, thirty-six being shown in the drawings. These are formed integrally with stems 44, preferably of cylindrical and an approximately uniform section, and fit into spaced holes in a solid nave 45, thus reducing the weight and mass of the stems to a minimum throughout the plane of the wheel between the buckets and nave, as is set forth in my copending application, Serial No. 120,378, for improvement in steam-turbine wheels.

The vanes or buckets 39 are of a concave form, divided into two parts by a central ridge 47, which latter may be either transverse to or in the plane of rotation, owing to the length and form of the vanes or buckets 39. The lips or discharge-angles of the latter are arranged approximately, as shown in Figs. III, IV, and V.

The main spindle 19 being wholly inclosed in the chambers 7 and 9 does not have to pass through packing-glands, consequently does not cause air-leaks into these chambers.

Having thus described the nature and objects of my invention, what I claim as new, and desire to secure by Letters Patent, is—

1. In a steam-turbine, a casing forming a circular main chamber, a second chamber parallel thereto, separated therefrom by a dividing-wall, bearings for a main motor-shaft secured to the walls of said main chamber and in the dividing-wall, bearings for a gear-shaft in the walls of the second chamber, one of which is the dividing-wall, shafts in said bearings respectively, and reducing-gears in the second chamber in connection with the main motor-shaft.

2. A casing forming a main chamber, a motor-wheel therein, a second chamber parallel to said main chamber, separated therefrom by a dividing-wall, a main shaft in said chambers sustaining said motor-wheel, bearings for said main shaft outside of said chambers, an intermediate bearing in said dividing-wall, reducing-gears in said second chamber, one of which is a pinion on said main shaft, and means for supplying motive power to said motor-wheel.

3. A casing forming a main chamber, a motor-wheel therein, a second chamber parallel to said main chamber, separated therefrom by a dividing-wall, removable covering-plates to said chambers respectively, closed bearings on said covering-plates, regulable means for oil-supply secured on said bearings, a main shaft held in said bearings, passing through said dividing-wall, supporting said motor-wheel, a gear-pinion on said main shaft, in said second chamber, shaft-bearings in the walls of said second chamber, a second shaft in said bearings, and a reducing gear-wheel on said shaft, within said second chamber, in mesh with said pinion on the main shaft.

4. A casing forming a closed main chamber, a motor-wheel therein, a second closed chamber adjacent and parallel to the main chamber, with a dividing-wall between, closed shaft-bearings in the main-chamber walls, a main shaft supporting said motor-wheel borne in said bearings, reducing-gears in said second chamber, connected with said main shaft, means for supplying motive power to said motor-wheel in said main chamber, and a pressure-equalizing passage between the two closed chambers.

5. A casing forming a main chamber, a motor-wheel therein, an exhaust-passage from said chamber, a second chamber adjacent and parallel to said main chamber, separated therefrom by a dividing-wall, a main shaft, supporting the motor-wheel in the main chamber and carrying a pinion in the second chamber, removable cover-plates on the outside of said chambers respectively, closed oil-holding bearings for the main shaft borne on said cover-plates respectively, a packed bearing on the cover-plate of the second chamber, a second shaft bearing on the division-plate between the two chambers, a rotatory shaft held in said bearings, and a reducing gear-wheel on said rotatory shaft, in mesh with the pinion on the main shaft.

6. A casing forming a main chamber, a motor-wheel therein, a second chamber adjacent and parallel to said main chamber, removable cover-plates on the outside of said chambers respectively, closed oil-containing shaft-bearings on said cover-plates respectively, movable horizontally-pivoted and vertically-divided shell-bearings within said closed oil-containing bearings, and a main shaft for said motor-wheel, held and automatically centered in said shell-bearings.

7. A casing forming a main chamber, a second chamber adjacent and parallel to said main chamber, closed shaft-bearings on the outer walls of said chambers respectively, a middle bearing between the chambers, in alinement with said outer bearings, a main shaft held in said bearings, reducing-gear in said second chamber, in connection with the main shaft, a motor-wheel in the main chamber, on the main shaft, means for supplying motive power to said motor-wheel, and a passage between the chambers for equalizing the temperature and pressure therein.

8. A casing forming a main chamber, a second chamber adjacent and parallel to said main chamber, a main shaft held in said chambers in closed bearings, a motor-wheel in the main chamber, means for supplying motive power to said motor-wheel, a second shaft revolubly held in bearings in the walls of the second chamber, the outer bearing being fitted with a packing-gland, the inner bearing being in the dividing-wall between the chambers, reducing-gearing in the second chamber, and means for equalizing the temperature and pressure in the two chambers.

9. A main casing, a motive wheel therein, a removable plate at the side of the motive-wheel chamber, one or more tangentially-disposed nozzles attached to this casing by screwed nipples, and insulated from the main casing, except as to these nipples, to prevent heat transmission, substantially as specified.

In testimony whereof I have signed my name to this specification in the presence of two subscribing witnesses.

JOHN RICHARDS.

Witnesses:
P. W. J. LANDER,
HENRY C. DROGER.